Patented Aug. 16, 1949

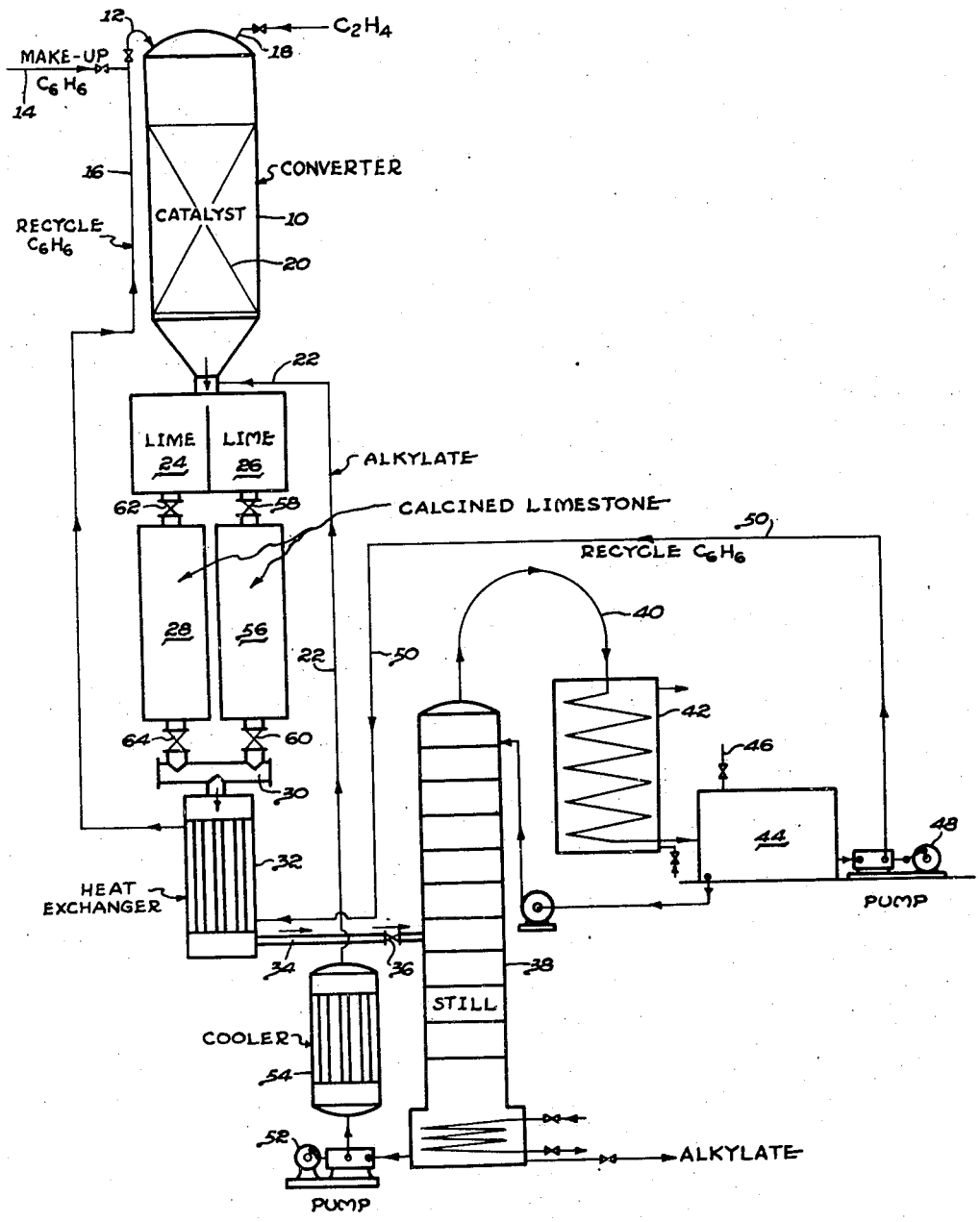

2,478,897

UNITED STATES PATENT OFFICE 2,478,897

PREVENTION OF CORROSION IN CATALYTIC REACTIONS INVOLVING THE USE OF PHOSPHORUS ACID CATALYSTS

Ben Bennett Corson, Pittsburgh, Pa., assignor to Koppers Company, Inc., Pittsburgh, Pa., a corporation of Delaware Application April 30, 1946, Serial No. 665,983

12 Claims. (Cl. 260—671)

This invention relates to the prevention of corrosion in the apparatus in which catalytic reactions are carried out wherein acid vapors are set free by the reaction. More particularly the invention relates to the treatment of vapors formed in the vapor phase alkylation of benzene with ethylene using phosphoric acid or its derivatives as a catalyst wherein phosphoric acid vapors are released with the ethyl benzene and pass through the converter with the ethylbenzene.

The acids and salts of phosphorus are active catalysts for promoting reactions such as the alkylation, polymerization and isomerization of hydrocarbons. These catalysts are also effective in the dehydration of alcohols. Some of these reactions require comparatively high temperatures such as 300° C. to 700° C. and, furthermore the reactions are carried out under comparatively high pressures. At these temperatures acid vapors are formed during the reaction and blend with the conversion products and flow together from the reaction zone into the heat interchangers, condensers and other equipment being used in refining the reaction products. The acid vapors are quite corrosive and soon make equipment such as valves, pumps, condenser tubes and the like unfitted for use.

I have found that the corrosive phosphorus compounds in the catalytic conversion products may be removed in two ways. The corrosive compounds may be selectively separated by an adsorption medium such as clay, or they may be separated by a chemical reaction by a basic compound, such as lime. However, I have found that the corrosive compounds may be advantageously removed by the use of both an adsorption agent and a basic adsorbent. This combination is very effective because the catalytic reaction products are generally hot and thus have a high vapor pressure. The hot reaction products must be cooled to permit an effective adsorption reaction with clay. On the other hand the corrosive acid constituents are more effectively adsorbed from the reaction products when they are hot. Thus by using lime with clay the lime will reduce the vapor pressure of the acid constituents so that the clay may effectively adsorb the acid constituents from the reaction products while hot. Also the lime tends to draw the acid constituents from the clay to give the clay a greater adsorptive capacity.

These phosphoric acids and phosphoric salts have a high catalytic activity and are very selective in the reactions which they promote. Therefore it is desirable that means should be found to avoid corrosion of the apparatus in which such catalysts are used.

The primary object of the present invention is to provide a method of treating catalytic conversion products containing acid gases to make them non-corrosive.

Another object of the invention is to provide a method of treating the conversion products obtained by the conversion of hydrocarbons with a phosphorous acid catalyst to render the reaction products non-corrosive.

Another object of the invention is to provide a method of treating the vapor product formed by the catalytic conversion of hydrocarbons with phosphorous acids while the products are hot to remove corrosive constituents.

A further object of the invention is to provide a method of treating the conversion products obtained by the alkylation of aromatic hydrocarbons with phosphorous acid catalysts to make the products non-corrosive to the refining equipment.

A still further object of the invention is to selectively adsorb acid constituents set free in a catalytic reaction.

With these and other objects in view the invention consists in the method of treating catalytic conversion products to make them non-corrosive as hereinafter described and particularly defined in the claims.

The various features of the invention are illustrated in the accompanying drawing which is a flow sheet of an apparatus in which benzene is alkylated with ethylene to form ethyl benzene while employing the present invention.

The present invention is applicable to all processes for converting products wherein an acid constituent is formed in the reaction and passes through the apparatus along with the conversion products. A specific example of the process is the catalytic alkylation of benzene with ethylene to form ethylbenzene.

Referring to the drawing benzene is introduced into a converter 10 through a line 12. The benzene is preferably preheated and vaporized and is introduced into the top of the converter as a vapor. The make-up benzene passes into the line 12 through a line 14 and a recycle benzene is introduced into the line 12 through a line 16. The benzene introduced into the top of the tower is mixed with ethylene vapors which are introduced adjacent the line 12 through a line 18. The mixture of benzene and ethylene vapors passes through a catalyst body 20, the reaction being carried out under a temperature of from 200° to 700° C. and preferably under a pressure of 500 to 900 lbs. per square inch. An excess of benzene is used in the reaction and the temperature and space velocity are preferably controlled so that substantially all of the ethylene is converted while passing through the catalyst bed. The catalyst bed is preferably composed of orthophosphoric acid which is deposited on a carrier such as kieselguhr or pumice, or it may be made up of a phosphate salt such as iron or metaphosphate.

In the catalytic alkylation of benzene with ethylene when using small amounts of phosphorous acids or phosphates, corrosive phosphorus compounds are set free and mingle with the conversion products. The hot conversion products passing through the catalyst bed flow out of the bottom of the converter 10 and pass into a granular body of clay and partially calcined limestone in chamber 24 or 26. After passing through chamber 24, for example, the vapor mixture passes through a second adsorption chamber 28 containing principally partially calcined lime with some clay wherein all of the acid constitutents are removed, and then flow into a header 30 from which the vapors pass through a heat interchanger 32. After passing through the heat interchanger 32 the vapors flow through a line 34 and pressure reducing valve 36 into the mid portion of a still 38. Here the vapor mixture is distilled to take overhead ethylene and benzene and to remove from the bottom of the still the ethyl benzene or alkylate which has been produced by the reaction. To assist in the distillation, the vapors passing overhead through a line 40 flow through a condenser 42 into a receiver 44. From the receiver 44 part of the benzene is pumped back into the top of the tower to serve as reflux. Any unreacted ethylene is removed from the top of the receiver 44 through a line 46 and may be returned to the line 18 at the top of the converter 10. Benzene which accumulates in the receiver 44 is taken by means of a pump 48 and passed through a line 50 to the interchanger 32. In the interchanger the benzene is vaporized and passes through the line 16 to the line 12. Preferably the benzene that is introduced into line 12 through the line 14 is vaporized benzene.

A portion of the alkylate may be, if desired, removed from the bottom of the still 38 by means of a pump 52 and passed through a cooler 54 to be cooled for quenching purposes. The cooled alkylate passes through the line 22 into the bottom of the converter to act as a quenching liquid to cool the reaction products and thus assist in adsorption of the corrosive constituents.

When lime and clay are used in the chambers 24 and 28 for adsorbing acid constituents from the conversion products the chamber 26 and a chamber 56 are cut off by means of valves 58 and 60 so that the conversion products do not pass through these chambers. In the operation of the apparatus when the lime in the chambers 24 and 28 becomes highly saturated with acid constituents, these adsorption chambers are taken out of the line by closing valves 62 and 64 and opening the valves 58 and 60. While this pair of chambers is cut out of the vapor circulation line, lime and clay may be removed from chamber 28 and new lime and clay introduced to be used when the lime and clay in the other set of chambers becomes saturated or partially saturated. Lime is used in the chambers 24 and 26 primarily for the purpose of protecting the valves 62 and 58. The lime in the chambers 28 and 56 protects the valves 64 and 60 as well as the pressure reducing valve 36 and the interchanger tubes. By having two beds of adsorbent material in series the acid constituents are effectively removed. It has been found, however, that a single bed will remove as high as 98% of the acid constituents.

An alkaline reacting metallic oxide which chemically reacts with the chemical constituents may be used for adsorbing or removing the corrosive acid constituents which are associated with the catalytic reaction products. The adsorbent used in the present invention is a basic adsorbent, such as lime or magnesia. Barium and strontium oxides may be used, but the lime and magnesia are so cheap and plentiful that they are the preferred adsorbents. The adsorbent is preferably produced by partially calcining a granulated limestone or a granulated magnesite ($MgCO_3$) or dolomite ($MgCa(CO_3)_2$). The granular material is preferably six to eight mesh in size and calcined to the point where fifty to sixty percent of the carbonate is converted to oxide. This partially calcined oxide has substantially the same physical strength as the carbonate.

If the catalytic reaction products are to be treated while hot, partially calcined limestone may be used as the adsorbent. Such limestone would be used in the chambers 24, 26, 28 and 56. It has been found, however, that the catalytic reaction products may be treated hot with a combination of calcined limestone and clay, such for example as Attapulgus adsorption clay. The clay should have a granular structure similar to the lime and be intimately mixed with the lime. The lime reacting with the acid constituents effectively reduces the vapor pressure of the acid constituents and allows the clay to effectively adsorb acid constituents that are not removed by the lime. Further the lime acts to remove from the adsorbent clay the acid constituents physically adsorbed and thus increases the life of the clay. It is preferred to use a major portion of lime in the chambers 24 and 26 and clay may be used in a major portion in the chambers 28 and 56 for removing the last traces of acid constituents. Lime or partially calcined limestone may be effectively used alone as the adsorbent for removing all corrosive constituents.

If the catalytic reaction is carried on at a high temperature (500° to 700° C.) it may be desirable to partially cool the vapors before they enter an adsorbent chamber 24 or 26. As explained above this cooling may be obtained by alkylate made in the process which is returned from the still 38 to the bottom of the converter 10.

A study of the catalytic reactions, such as alkylation, polymerization and isomerization of hydrocarbons shows that phosphorous acid vapors are set free from phosphorous acid and phosphates and pass through the apparatus with conversion products.

The phosphorous acid vapors formed in the alkylation of the benzene with ethylene occur in two forms, a water-soluble phosphorus and a hydrocarbon-soluble phosphorus. The water-soluble phosphorus compounds have been found to be phosphoric acid, while the hydrocarbon-soluble phosphorus compunds are in the form of complex organic phosphates.

The phosphorus concentration in the alkylates formed in the alkylation of benzene with ethylene have an average concentration for the first four days of approximately six milligrams per litre. As the operation is continued the phosphorus concentration increases to as high as 10 to 15 milligrams per litre. In a thirty day test the average concentration was slightly above 8.7 grams of phosphoric acid per litre. Tests have shown that by decreasing the temperature in the conversion chamber from 325° to 275° C. that the phosphorus concentration in the alkylate decreased fifty-two percent. However, if the conversion temperature was increased from 325° C. to 380° C. the phosphorus content in the alkylate increased forty-eight percent. Furthermore by decreasing the pressure in the reactor from 900 lbs. per square inch to 500 lbs. per square inch, while maintaining a temperature of 325° C., the phosphorus concentration was decreased eighty-three percent.

The temperature of 325° C. and 900 lbs. per square inch pressure have been found to be the preferred conditions under which the catalytic conversion should be carried out. The use of lime or other alkaline earth oxides will effectively remove acid constituents from the conversion products when the reaction is carried out at temperatures of 325° C. and 900 lbs. per square inch pressure.

In effectively removing the acid constituents from the conversion products, it has been found that the volume of basic adsorbent or combined adsorbent and adsorption material should be at least equal to the volume of catalyst by which the reaction is carried out. This volume of basic adsorbent will remove the acid constituents and by having adsorbent chambers which may alternately be switched into the process, the process may be carried out continuously and without trouble of corrosion.

The preferred form of the invention having been thus described, what is claimed as new is:

1. A process comprising alkylating an aromatic hydrocarbon with an olefine in the presence of a phosphorous acid catalyst at a temperature sufficiently high to set free acid vapors from the catalyst, passing the conversion products with the acid vapors while hot through an adsorbent bed of granular calcined alkaline earth carbonate to selectively remove the acid vapors from the conversion products.

2. The method defined in claim 1 in which the adsorbent is calcium oxide.

3. The method defined in claim 1 in which the adsorbent is a partially calcined limestone.

4. The method defined in claim 1 in which the adsorbent is a fifty to sixty percent calcined limestone.

5. The method defined in claim 1 in which the adsorbent is magnesium oxide (MgO).

6. The method defined in claim 1 in which the adsorbent is partially calcined magnesium carbonate ($MgCO_3$).

7. The method defined in claim 1 in which the adsorbent is partially calcined dolomite.

8. The method as defined in claim 1 in which the conversion is a catalytic alkylation carried out at a temperature above 500° C. and under a pressure above 500 lbs. per square inch.

9. The method defined in claim 1 in which benzene is alkylated with ethylene with the phosphorous acid catalyst.

10. The method defined in claim 1 in which the conversion vapors are passed through a granular bed of lime and clay while hot.

11. The method defined in claim 1 in which the conversion products are passed while hot through a granular bed composed of a neutral clay adsorption medium mixed with a basic partially burned limestone adsorbent which adsorbs acid constituents taken up by the adsorption medium.

12. The process defined in claim 1 in which the conversion products, together with the acid vapors are partially cooled before being passed into contact with the solid adsorbent.

BEN BENNETT CORSON.

REFERENCES CITED

The following references are of record in the file of this patent:

UNITED STATES PATENTS

| Number | Name | Date |
| --- | --- | --- |
| 1,802,628 | Caldwell | Apr. 28, 1931 |
| 1,904,381 | Morrell | Apr. 18, 1933 |
| 1,914,668 | Lachman | June 20, 1933 |
| 1,935,162 | Morrell | Nov. 14, 1933 |
| 2,034,712 | Dolbear | Mar. 24, 1936 |
| 2,227,811 | Moser | Jan. 7, 1941 |
| 2,341,567 | Moriarty | Feb. 15, 1944 |
| 2,412,229 | Schaad | Dec. 10, 1946 |
| 2,414,206 | Layng | Jan. 14, 1947 |